United States Patent [19]

Kulczycki, Jr. et al.

[11] Patent Number: 5,223,284
[45] Date of Patent: Jun. 29, 1993

[54] PRODUCTS AND METHODS FOR TREATING COLIC

[75] Inventors: Anthony Kulczycki, Jr.; Patrick S. Clyne, both of St. Louis, Mo.

[73] Assignee: Washington University, St. Louis, Mo.

[21] Appl. No.: 703,889

[22] Filed: May 22, 1991

[51] Int. Cl.$^5$ ............................................... A23C 9/12
[52] U.S. Cl. ................................... 426/42; 426/74; 426/271; 426/491; 426/520; 426/583
[58] Field of Search ............... 426/41.074, 2, 42, 580, 426/583, 491, 804, 520, 656, 271

[56] References Cited

U.S. PATENT DOCUMENTS

| | | | |
|---|---|---|---|
| 3,868,467 | 2/1975 | Olson | 426/2 |
| 4,765,981 | 8/1988 | Joseph | 426/436 |
| 4,954,361 | 9/1990 | Girsh | 426/580 |

OTHER PUBLICATIONS

Jakobsson et al. "Dietary Cows Milk Protein is Transferred to Human Milk" Nutrition Reviews (1986) 44 (4) pp. 135–137 Dialog Abstract No. 0470069 file 50.

Clyne et al., Human Breast Milk Contains Bovine IgG Relationship to Infant Colic Pediatrics vol. 87 No. 4 (1991) pp. 439–444 published Apr. 2, 1991 Dialog Abstract No. 8543042 file 5.

*Primary Examiner*—R. B. Penland
*Attorney, Agent, or Firm*—Marshall, O'Toole, Gerstein, Murray & Borun

[57] ABSTRACT

The present invention provides products, processes and/or methods for treating or preventing the clinical symptoms of an infant suffering from colic. Products and/or methods which reduce or eliminate the level of bovine IgG in food products are also useful to treat patients experiencing clinical symptoms related to ingesting bovine food products.

12 Claims, No Drawings

PRODUCTS AND METHODS FOR TREATING COLIC

This invention was made with Government support under 5 RO1 AI 24005 awarded by the National Institutes of Health. The Government has certain rights in the invention.

BACKGROUND OF THE INVENTION

The present invention relates generally to products, processes and methods for reducing, eliminating or preventing in a patient the gastrointestinal inflammatory symptoms caused by ingesting bovine food products and particularly to a method of reducing, eliminating or preventing the clinical symptoms of infants suffering from colic.

Colic is a disorder of early infancy which is typically characterized by paroxysms of crying, apparent abdominal pain and irritability. Although intestinal pain or distress are related to this problem, the causes and the specific mechanisms of infant colic are generally considered to be unknown. This frustration is clearly evident in the related literature because colic etiology and pathogenesis are poorly understood. See, for example, *A Clinical Manual of Emergency Pediatrics*, E. F. Crain and J. C. Gershel eds., pg. 182, Appleton-Century-Crofts, Norwalk, Conn. (1986).

The direct cause of recurrent colic attacks is usually not apparent, though it has been suggested that the attacks may be associated with hunger and with swallowed air which has passed into the intestine. Other suggested causes include overfeeding, certain types of foods, especially those of high carbohydrate content, individual infant temperament and emotional upset, even parental anxiety. No single factor consistently accounts for colic, nor does any treatment consistently provide satisfactory relief. See, for example, *Nelson Textbook of Pediatrics*, 13th edition, R. E. Behrman and V. C. Vaughan, eds., Section 3.13, W. B. Saunders Co., Phila., Pa. (1987).

Not unexpectedly, there are numerous unproven theories about the association of different foods and formulas with the symptoms of colic. Allergies to cow milk, immaturity of an infant's gastrointestinal tract or central nervous system, or poor feeding technique have all been considered. Even though diet has been implicated as a possible cause, the relationship between diet and colic is still disputed. Some cases of colic may represent intolerance to cow milk (cow milk allergy or congenital lactose intolerance) but these probably constitute only a small minority of cases. Some consider empirical changes of formula need not be considered routine therapy for colic, *Manual of Clinical Problems in Pediatrics*, K. B. Roberts ed., p. 79, Little, Brown, & Co., Boston, Mass. (1990). No one theory or concomitant therapy has of yet gained uniform acceptance.

For the most part colic is a diagnosis which is made after other reasons or causes of similar symptoms, such as infections, have been eliminated. The most typical symptom of colic is unexplained or excessive crying. Excessive crying episodes may be more quantitatively defined to include episodes crying at full force many times a day at least four days a week for at least one week or more. Each episode may last from thirty minutes to two hours and total crying may be more than three hours a day. See, for example, the description of the clinical symptoms set out in the *Merck Manual of Diagnosis and Therapy*, 15th Edition, p. 1833 (1987) and by Lothe and Lindberg, *Pediatrics* 83:262-266 (1989). Although excess crying is a principal symptom, one or more of the following symptoms may also be present in an affected infant including abdominal guarding, legs pulled up, or disturbed sleep.

Both nursing and formula fed infants develop colic at a similar rate and a number of causes and associated remedies have been used to try and reduce or eliminate the distress associated with colic. In some mild cases, an infant may respond to being held, rocked or gently patted. Use of pacifiers is another well known remedy to soothe infants that have a strong sucking urge even after feeding. Other infants may respond by being tightly swaddled. Dietary changes and in some cases the judicious use of a sedative may be recommended to provide relief.

Recently, evidence has become available that points to diet as being a principal cause of infant colic. Specifically, a double blind study of Lothe and Lindberg, *Pediatrics*, 83:262-266 (1989) reports that cow milk whey proteins elicit symptoms of infant colic in colicky formula fed infants. In this study, Lothe and Lindberg found that a majority of infants whose colic had subsided on a casein hydrolyzate (whey-free) formula reacted with colicky symptoms when given formula spiked with powdered whey protein. These authors also suggested that $\beta$-lactoglobulin may be particularly suspect as a cause of the symptoms, and noted that this bovine protein has also been found to be transferred to human breast milk. However, the level of $\beta$-lactoglobulin that is found in breast milk ($\mu$g levels) is significantly lower than the levels of $\beta$-lactoglobulin in formula (mg levels) which is inconsistent with the observation that both nursing and formula fed infants suffer from colic at equivalent rates and with apparently equivalent serverity. Other studies, however, do not unambiguously show either a direct or indirect relationship between bovine proteins and infant colic. See, for example, the report of Evans, et al., *Lancet*, 1:1340-1342 (1981).

Recent reports suggest that another bovine protein is associated with colic. For example, Clyne and Kulczycki, *Ped. Res.*, 25:160A (1989), initially reported that milk samples from a number of nursing mothers contained substantial amounts of bovine immunoglobulin G (IgG), and that high levels of bovine IgG were found in the diets of colicky infants. Later, the same authors, *Pediatrics*, 87:439-444 (1991), compared the levels of bovine IgG in bovine milk-based formulas and breast milk. Their results suggest that substantial quantities of bovine IgG are present in human breast milk and indicate that significantly higher levels of IgG are present in the milk of mothers of colicky infants. The study also shows that mothers without high levels of bovine IgG in their milk do not appear to have colicky infants.

There is clearly a long sought need of a method of reducing or eliminating the symptoms of colic in infants which is met by the present invention.

Furthermore, the present invention also provides a method of reducing the gastrointestinal symptoms associated with the ingestion of bovine products, especially milk based products, in older children and adults. In particular, patients suffering from some gastrointestinal disorders such as ulcerative colitis, eosinophilic gastroenteritis, or Crohn's disease may have symptoms that are initiated or exacerbated by ingesting food products containing bovine IgG. These unwanted symptoms may be reduced or eliminated by providing food products having a reduced bovine IgG content to these patients.

SUMMARY OF THE INVENTION

The present invention provides a method for moderating or eliminating the clinical symptoms of an infant suffering from colic caused by or associated with the infant's diet by administering a diet to the infant that is reduced in the content of bovine IgG. The infant's diet may include a bovine milk-based formula having a reduced bovine IgG content. Alternatively, the infant's diet may include human breast milk having a reduced bovine IgG content.

According to this invention, a bovine milk-based formula may be prepared by enzymatically treating whey to reduce the bovine IgG content of the whey by destroying the protein or from a whey fraction including bovine IgG by heating the whey fraction at a temperature effective to reduce the bovine IgG content by denaturing the protein. In addition, a suitable formula may be prepared by contacting a whey fraction with agents that selectively bind bovine IgG and that separate the bound bovine IgG from other bovine milk constituents or by contacting a whey fraction with a salt suitable to precipitate bovine IgG and then separating the precipitated bovine IgG from soluble bovine milk constituents. An alternative method of producing formula reduced in bovine IgG would be to eliminate use of whey protein, and prepare a casein-based formula comprising casein hydrolyzed partially so that it is digestible by the infant gastrointestine, but not hydrolyzed to the point where it presents a high osmotic load that can cause diarrhea. A preferred level of bovine IgG in a milk-based formula is less then about 20 $\mu g/ml$, preferably less than about 2 $\mu g/ml$, more preferably less than about 0.6 $\mu g/ml$ and most preferably less than 0.22 $\mu g/ml$.

If the infant is being nursed, the content of bovine IgG in the human breast milk is reduced by limiting the maternal dietary intake of bovine food products containing bovine IgG for a period of time sufficient to reduce the bovine IgG content of the breast milk. Preferably, the amount of bovine IgG in the breast milk is less than about 2.0 $\mu g/ml$, more preferably less than about 0.6 $\mu g/ml$ and most preferably less than 0.22 $\mu g/ml$.

In addition, the present invention provides a method for moderating, eliminating or preventing the clinical symptoms in a patient suffering from symptoms caused by or associated with ingesting bovine IgG comprising administering to the patient a diet substantially reduced in bovine IgG content.

DETAILED DESCRIPTION

The method of treating colic of the present invention differs from known technology because the method is focused on selectively reducing or eliminating bovine IgG from an infant's diet. As used in this disclosure, the terms "reduce" and "eliminate" include processes that physically extract bovine IgG as well as processes that selectively destroy and/or denature bovine IgG in such a way as to moderate, eliminate or prevent the unwanted physiological effects of the protein when it is ingested. Complete removal of bovine Ig is not necessary provided that the content of bovine IgG in a formula or a food product does not cause undesired physiological reactions.

In comparison to this invention, current technology is pointed toward reducing antigenicity of all of the proteins generally found in infant formulas or other bovine food products. Specifically, current technology such as heating of bovine milk-based infant formulas to high temperatures does, in part, decrease antigenicity. The present invention provides an improved formula by using heating selectively to reduce or eliminate bovine IgG concentrations in materials making up the formula. In the present process, only a separated whey fraction of bovine milk containing bovine IgG is heated in a denaturation step, providing a product in which the other milk components, such as casein, are not subjected to extensive heating. A resulting product formed by recombining the extensively heated whey with the less-extensively heated casein results in an improved product having an effectively lower bovine IgG content and a less "cooked" taste.

Other known processes to produce less "allergenic" formulas typically use enzymes to completely hydrolyze casein fractions of milk to obtain a hydrolyzate which may be less allergenic or less immunologically reactive than untreated, standard formula. The drawbacks of these processes are that extensive enzymatic hydrolysis is costly and results in a product containing single amino acids that cause loose stools (because of the high osmotic load), inferior taste and reduced product stability and/or emulsification. Other related processes partially hydrolyze milk protein in an effort to make hypoallergenic formulas, but these partial processes are generally ineffective because relatively large peptides persist and such peptides may also elicit significant immunologic responses or reactions.

The present invention provides processes that are specifically adapted to selectively removing reducing bovine IgG from bovine products and are particularly well suited for removing bovine IgG from isolated whey solutions. The level of bovine IgG in a product is readily determined using a known method described Clyne and Kulczycki, *Pediatrics*, 87:439–444 (1991). This method is suitable for the determination of the level of bovine IgG in human breast milk because it is specific, and does not inappropriately detect human IgG, other human milk proteins, or other bovine milk proteins.

Processes suitable for the reduction of bovine IgG content include selective precipitation by "salting out," chromatographic processes, and enzymatic and heat treatments. The "salting out" process may use any of a variety of polyatomic anionic salts that are generally regarded as safe for use in food products. For example, aluminum ammonium sulfate, sodium tartrate, sodium or potassium phosphate, sodium citrate, sodium sulfate, or other salts or combinations of salts are acceptable. The mechanism of "salting out" typically involves the interaction of salt ions with water molecules so that the water available to keep the undesired proteins in solution is effectively reduced. Bovine IgG is removed at lower salt concentrations than other whey proteins including lactoglobulin, lactalbumin or albumin.

In using chromatography to selectively reduce the content of bovine IgG, one important consideration is the scale of the ion exchange separation procedure. In most ion exchange column procedures, scaling up to large columns results in a detrimental "packing" of the columns that causes unacceptably slow and inefficient flow rates. For efficient removal of bovine IgG using a column it is preferable to apply known methods, such as radial-flow chromatography, that permit efficient flow of a solution through the column. Radial-flow columns are marketed by Sepragen Inc. (San Leandro, Calif.) and by CUNO Europe SA (Cergy-Pontoise, France). It is also possible to use an ion exchange resin that is not easily compressed, such as an ion exchange resin coupled to polystryene beads marketed by PerSeptive Biosystems (Cambridge, Mass.). Further, a batch method, e.g. mixing whey and resin in a vat, allowing resin to settle, draining the whey having a reduced IgG content from the resin and stripping the bovine IgG from the resin before its reuse is another viable method.

An alternative chromatographic method uses an ion exchange resin, such as a carboxy-methyl cellulose, that binds whey proteins such as albumin, lactalbumin, and lactoglobumin but does not bind bovine IgG. The bound proteins are thus separated from the bovine IgG and may then be eluted from the column by changing the pH and/or salt concentration of the buffer (singly or in various combinations) to obtain a whey solution free of bovine IgG.

Other separation processes for removing bovine IgG from a food product include the use of available bacterial proteins, such as protein G, coupled to a resin, which is then used to remove bovine IgG from a solution in a method analogous to the ion exchange methods above. Similarly, antibodies against bovine IgG could be coupled to beads, for example SEPHAROSE CL-6B beads, and these bound antibodies could be used to selectively remove bovine IgG. Those of ordinary skill in the art will readily recognize that there are equivalent processes that selectively or semi-selectively remove bovine IgG from whey or other diary products and which are encompassed by this invention.

Digesting strategies using enzymes and/or heating to high temperatures may also be used to selectively reduce or eliminate bovine IgG whether alone or in combination with the above described separation methods.

As described briefly above, controlled heating of a whey fraction of milk that is separated from the casein fraction is one means of accomplishing selective reduction or elimination of bovine IgG by denaturation. Alternatively, enzymes, such as pepsin, may selectively destroy most of the bovine IgG present in whey, de Rham and Islike, *Int. Archs. Allergy Appl. Immun.*, 55:61–69 (1977).

Thus, the above described processes may be used to provide whey that is bovine IgG-depleted and is useful to prepare an infant formula that provides a diet that will reduce the incidence or severity of infant colic. Casein formulas lacking whey protein entirely, and several types of formula products that include whey protein such as formula prepared from whey fractions from which bovine IgG is reduced by methods including physical extraction, enzymatic digestion or heat denaturation, whether or not such fractions are recombined with casein fractions, are within the scope of this invention.

The present processes may also be applied to other dairy products that may be improved by reducing or eliminating bovine IgG. Such products would be particularly beneficial for women who are breast feeding infants, because it is established that bovine IgG ingested by a nursing woman is transferred to breast milk.

Other benefits may also be afforded to older children and adults. For example, high levels of bovine IgG is found in the serum of a child with "milk-induced colitis." In addition, bovine IgG interactions with cells of the human immune system in vitro suggest that bovine IgG may have a role in ulcerative colitis and other inflammatory bowel disorders such as eosinophilic gastroenteritis, Crohn's disease, and regional enteritis as well as in Henoch-Schonlein purpura and irritable bowel syndrome in adults, Kulczycki, A. *Molecular Immunology*, 24:259–266 (1987). Furthermore, some cases of rheumatoid arthritis are exacerbated by milk-consumption and some arthritis patients have high titers of rheumatoid factor autoantibodies more specific for bovine IgG than human IgG. Thus, patients with rheumatoid arthritis and other autoimmune diseases may have their diseases initiated or exacerbated by dietary consumption of bovine IgG. Thus, bovine IgG-depleted dairy products may have a variety of uses in the prevention or treatment of diseases or conditions other than colic.

Some milk intolerance is clearly due to the deficiency of the enzyme lactose and the inability to digest the milk sugar lactose. However, a variety of other milk intolerant syndromes are poorly understood such as increased naso-pharyngeal mucus secretion, rhinitis, milk-exacerbated asthma, milk-exacerbated atopic dermatitis, and milk allergy. Many of these intolerances or allergy-like syndromes may also be related to bovine IgG and would respond to diets containing dairy products having reduced bovine IgG content.

It has also been shown that IgA-deficient patients can absorb bovine IgG from dietary sources. Patients with IgA deficiency, common variable immunodeficiency, AIDS, or other immune system immunodeficiencies may benefit from using dairy food products having reduced bovine IgG content in order to reduce the incidence and severity of gastrointestinal disorders.

The benefits of the present invention are demonstrated in a study of formula fed infants. Infants for the study are identified as suffering from colic if they experience the following: intermittent, unexplained excessive crying lasting from thirty minutes to two hours (crying at full force) many times a day for at least four day per week and continuing for one week or more; crying for a total of about three hours or longer per day; total duration of crying and fussing of at least 3 hours in two consecutive 24 hour periods; crying and fussing behavior that failed to respond to mothercraft skills with no apparent cause for crying and fussing; or a behavioral syndrome brought as a concern to the physician.

In the study, infants are initially evaluated for a period of six days in order to establish and identify the listed symptoms. Individual symptoms are recorded in a daily diary using standardized activity definitions including time spent asleep, awake and content, awake and crying, awake and fussy, and awake and feeding. In addition, the intensity of any cries are noted (scale 1 to 5).

After the six day evaluation period, the infants are given a non-milk based formula, ALIMENTUM, for a ten day period and are then randomly assigned into two groups: each group receives, in double-blind fashion, a formula supplement of either bovine IgG or placebo capsules which are added to the formula for several days. Next the groups are switched, still double-binded, to the alternate formula supplement. Diaries of activity for the entire observation period are then correlated with the specific formula supplement given during each ten day period.

The bovine IgG (3.0 grams) used in the study is isolated from a frozen supply of bovine colostrum by salt precipitation and gel chromatography on a one liter column of SEPHAROSE CL-6B. The preparation of the bovine IgG is done using methods that ensure its safety for human consumption.

About 100 mg of the purified bovine IgG is mixed thoroughly with 500 mg of NUTRAMIGEN powder and added in equal portions to ten IgG capsules and about 600 mg of Nutramigen powder, also in equal portions, is added to ten placebo capsules. In summary, the capsules contain 10 mg of either bovine IgG or human albumin plus 50 mg of NUTRAMIGEN powder.

In the study, solid phase radioimmunoassay is used to determine that the bovine IgG level in the supplemented formula (capsule plus ALIMENTUM) exceeds 19 µg/ml but not 200 µg/ml.

The study indicates that the infants fed with formula containing bovine IgG experienced the clinical symptoms of colic to a greater degree than the infants fed with formula containing placebo.

The following examples describe several techniques of reducing bovine IgG in bovine milk products.

EXAMPLE 1

Reduction of Bovine IgG in Whey Using Selective Precipitation

A pasteurized cow whey or whey concentrate solution is adjusted to pH 7.6-7.7 by addition of aqueous NaOH or HCl or other suitable food grade acids or bases. For each 10 liters of volume, 3-4 kg of solid sodium citrate (tri-sodium citrate salt) is added to the whey solution at room temperature or at a temperature high enough to solubilize the sodium citrate without causing spoilage. The mixture is cooled to 4° C. and then centrifuged, filtered, and separated, or allowed to settle. The supernatant contains whey proteins which are essentially free of bovine IgG and which may be dialyzed to remove the added sodium citrate.

Alternatively, a pasteurized cow whey or whey concentrate solution is adjusted to approximately neutral pH using suitable food grade acids or bases. To each liter of the solution is added one liter of a cold saturated solution of ammonium sulfate which had been previously filtered and adjusted with a food grade base to about pH 8 at room temperature. The mixture is cooled and then separated to remove the precipitate containing bovine IgG. The supernatant is dialyzed or electrodialyzed to remove the ammonium sulfate. The resultant whey or whey concentrate is essentially free of bovine IgG and is then used for manufacture of food products using known processes.

Those of ordinary skill in the art will readily recognize that modifications in temperatures, pH or salt concentrations may be used to accomplish the same result. A suitable salt either may be added as a solid or as a saturated solution. Other milk derived starting products may be used, such as reduced-lactose whey, whole milk, or skim milk. Consistent with good manufacturing processes, the whey or milk product is pasteurized, typically before salting.

EXAMPLE 2

Reduction of Bovine IgG in Whey Using Ion Exchange Chromatography

This example describes the use of ion exchange chromatography to remove bovine IgG from a whey or whey concentrate solution. A whey solution that does not contain particulates that would clog up the subsequent separation, such as freshly manufactured whey, filtered or ultrafiltered whey, is adjusted to a desired pH and ionic strength. The adjusted solution is dialyzed against 0.01M sodium phosphate −0.15M sodium chloride solution at pH 7.4. The solution is then passed through a column containing either DEAE and a DEAE-type ion exchange resin, which selectively binds the bovine IgG. The whey product recovered from the column is partially or completely depleted of bovine IgG, and may be further processed to remove unwanted salts prior to making a desired formula or food product. The column may be regenerated by washing the ion exchange column with a more concentrated salt solution to remove the bovine IgG from the ion exchange resin. One of ordinary skill will readily recognize that many possible buffer conditions may be used for dialysis and/or dilution, particularly solutions containing chemicals that are generally regarded as safe.

Numerous modifications and variations of the above-described invention are expected to occur to those of skill in the art. Accordingly, only such limitations as appear in the appended claims should be placed thereon.

What is claimed is:

1. A process for reducing the bovine IgG content of a cow's milk product having both whey components and casein components consisting essentially of the following steps:
   a) separating the whey components of the cow's milk product from the casein components;
   b) treating a liquid solution of said whey components to reduce the IgG content thereof to a level of less than about 20 µg/ml, based on the volume of the cow's milk product wherein said treating does not substantially alter any milk-containing proteins in said liquid solution of whey components other than bovine IgG; and
   c) recombining the treated whey components with at least a portion of said casein components.

2. The process of claim 1 wherein said treating step b comprises:
   i) adding a food grade polyatomic salt to said liquid solution of whey components;
   ii) separating precipitated bovine IgG from said solution; and
   iii) removing any polyatomic salt remaining in said liquid solution by dialysis.

3. The process of claim 2 wherein the polyatomic salt is selected from the group consisting of: aluminum ammonium sulfate, sodium tartrate, sodium phosphate, potassium phosphate, sodium citrate, sodium sulfate or combinations thereof.

4. The process of claim 1 wherein said treating step b comprises contacting said liquid solution of whey components with an ion exchange resin having an affinity for bovine IgG.

5. The process of claim 1 wherein said treating step b comprises contacting said liquid solution of whey components with a bacterial protein which is coupled to a solid-phase support.

6. The process of claim 5 wherein said bacterial protein is protein G.

7. The process of claim 1 wherein said treating step b comprises contacting said liquid solution of whey components with an antibody to bovine IgG, wherein said antibody is coupled to a solid-phase support.

8. The process of claim 1 wherein said treating step b comprises contacting said liquid solution of whey components with an enzyme for digesting bovine IgG.

9. The process of claim 1 wherein said treating step b comprises heating said liquid solution of whey components to denature the bovine IgG protein.

10. The process of claim 1 wherein said IgG content is reduced to a level of less than about 2 µg/ml.

11. The process of claim 1 wherein said IgG content is reduced to a level of less than about 0.6 µg/ml.

12. The process of claim 1 wherein said IgG content is reduced to a level of less than about 0.22 µg/ml.

* * * * *